United States Patent [19]

Jobard

[11] Patent Number: 5,289,093
[45] Date of Patent: Feb. 22, 1994

[54] ANTISPIN AND ANTILOCK METHODS FOR AN ELECTRIC TRACTION VEHICLE

[75] Inventor: Thierry Jobard, Lyons, France

[73] Assignee: GEC Alsthom SA, Paris, France

[21] Appl. No.: 969,517

[22] Filed: Oct. 30, 1992

Related U.S. Application Data

[63] Continuation of Ser. No. 605,702, Oct. 30, 1990, abandoned.

[30] Foreign Application Priority Data

Nov. 8, 1989 [FR] France .................. 89 14666

[51] Int. Cl.$^5$ .............................................. H02P 7/00
[52] U.S. Cl. ..................................... 318/434; 318/52
[58] Field of Search .................. 318/434, 52, 71, 78, 318/139, 798–812, 432; 361/238; 180/197; 303/93–95, 100, 102

[56] References Cited

U.S. PATENT DOCUMENTS

| | | | |
|---|---|---|---|
| 3,764,867 | 10/1973 | Smith | 318/52 |
| 3,997,822 | 12/1976 | Logston, Jr. et al. | 318/52 |
| 4,320,332 | 3/1982 | Sugimoto | 318/807 X |
| 4,461,758 | 7/1984 | Krohling | 318/99 X |
| 4,588,932 | 5/1986 | Riondel | 318/52 |
| 4,658,189 | 4/1987 | Trusock | 318/52 |
| 4,695,941 | 9/1987 | Kumar | 318/565 |
| 4,701,682 | 10/1987 | Hirotsu et al. | 318/52 |
| 4,825,131 | 4/1989 | Nozaki et al. | 318/52 |
| 4,841,207 | 6/1989 | Cheyne | 318/139 X |
| 4,896,090 | 1/1990 | Balch et al. | 318/52 |
| 5,140,248 | 8/1992 | Rowan et al. | 318/811 |

FOREIGN PATENT DOCUMENTS 3720184 12/1987 Fed. Rep. of Germany .
3714404 11/1988 Fed. Rep. of Germany .
2512556 3/1983 France .

OTHER PUBLICATIONS

Elektrische Bahnen, vol. 84, No. 2, 1986, Munich, Germany, pp. 43-57; H.-P. Bauer et al.: "Optimale Kraftschlussausnutzung Durch Selbstadaptierende Radschlupfregelung Am Beispiel Eines Drehstrom-Lokomotivantriebes".

Primary Examiner—Jonathan Wysocki
Attorney, Agent, or Firm—Sughrue, Mion, Zinn, Macpeak & Seas

[57] ABSTRACT

A method of preventing wheel spin or wheel locking on an electric traction vehicle whose traction transmission includes servo controlling of one or more control parameters of the motor(s) of the traction transmission to an input reference value. The method is such that the control parameter(s) obtained at the output from the servo control are permanently limited by ideal values for the control parameter(s), which ideal values are such as to make it possible to obtain an input reference value for the speed of rotation of the motor(s) equal to the real travel speed of the vehicle, referred to as the reference speed, in such a manner as to stabilize the torque transmitted by the motor(s) in the event of wheel spin or wheel locking.

9 Claims, 5 Drawing Sheets

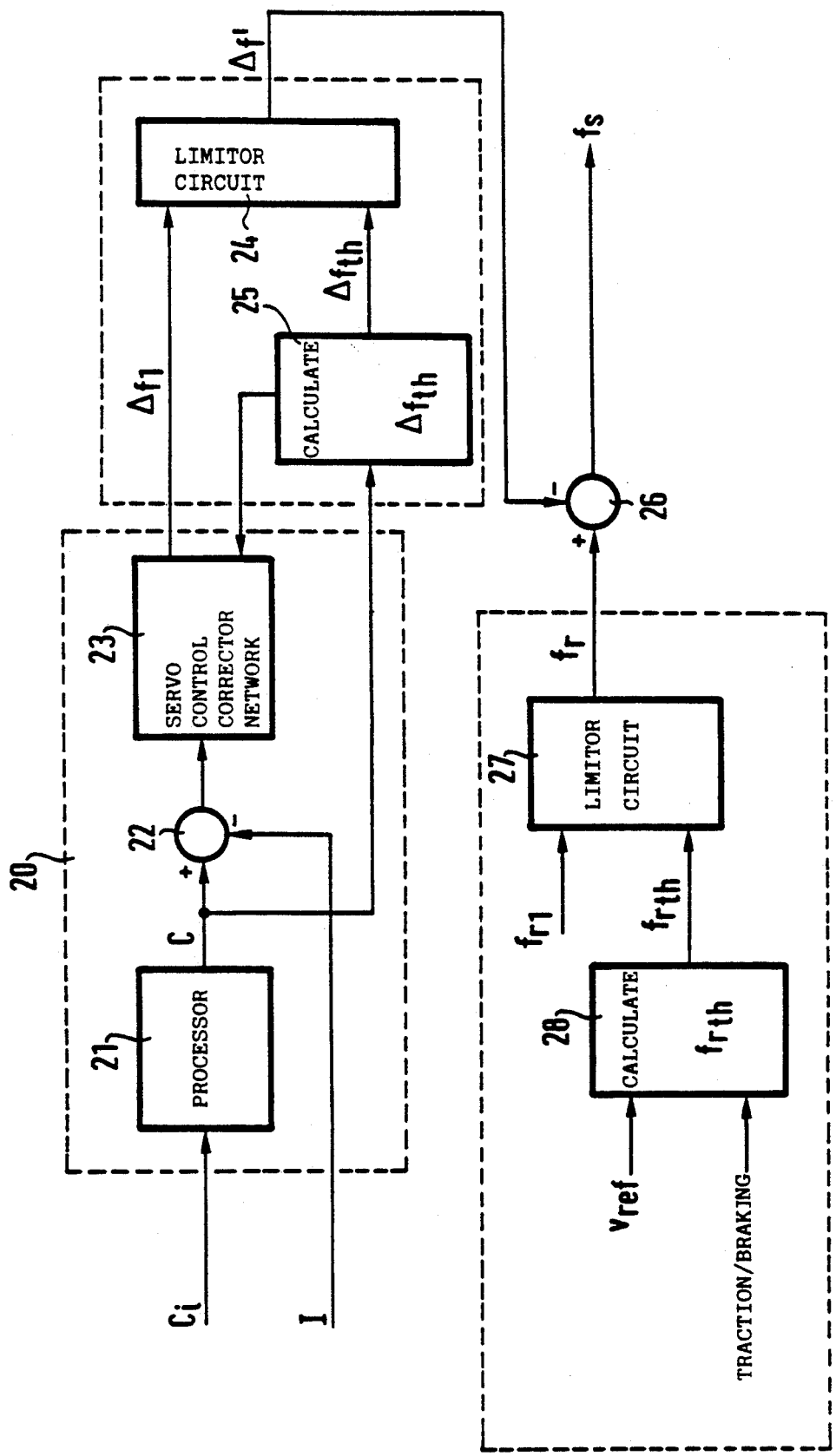

ANTISPIN AND ANTILOCK METHODS FOR AN ELECTRIC TRACTION VEHICLE

This is a continuation of application Ser. No. 07/605,702 filed Oct. 30, 1990 now abandoned.

BACKGROUND OF THE INVENTION

1. Field of the Invention

The present invention relates to controlling the traction motors of a road or rail vehicle having electric traction or electric transmission (as applies to diesel-electric vehicles).

2. Description of the Related Art

At present, electric traction devices are servo-controlled to torque or to current, i.e. the control system seeks permanently to cause the electric motor(s) under its control to provide a torque or to take a current equal to a reference value given to the control system. If the reference value produces a force which is greater than that which can be transmitted to the ground by the mechanical transmission (as happens with reduced adhesion or "grip", e.g. due to bad weather conditions), then wheelspin occurs if traction is being applied, or wheellocking occurs if braking is being applied. At present, in order to overcome these phenomena, an antispin or an antilock system is added to the control system to correct the reference value as provided by a human or an automatic driver so that the control system for the traction device is always given a reference value that is no greater than the torque which the adhesion allows to be transmitted.

This antispin or antilock system which may be implemented in analog electronic form or as software in a microprocessor system, requires the following to be known:

the speeds of the wheels driven by the transmission under consideration;

a reference speed representative of the real speed at which the vehicle is moving and which may either be measured using a wheel on an axle which is undermotorized or not motorized (and which therefore runs no risk of spinning) or which is underbraked or not braked (and which therefore runs no risk of locking), or which is measured by some other device, e.g. using the Doppler effect, or else which is calculated (as described in French patent No. 2 512 556, for example) from the speeds of all of the wheels of the vehicle (integrating a plausible mean acceleration for the vehicle up to a maximum set by the smallest wheel speed in traction or down to a minimum set by the greatest wheel speed in braking). On the basis of this information, the antispin or antilocking system calculates and filters the difference of each speed relative to the reference speed, the acceleration of each wheel, and optionally the derivatives of these accelerations, and it generates a spin or lock signal on the basis of all these magnitudes, which signal is used to correct the reference given by the driver. This correction is performed as follows, as shown in FIG. 1 which shows the input reference CI and the corrected reference CI' as a function of time:

in traction, as soon as the beginning of the wheelspin is detected, i.e. at an instant marked $t_0$ in FIG. 1, the reference $CI_0$ that was present at the instant spin appeared is suddenly and considerably reduced, thereby enabling wheels that have lost adhesion to regain it (stage marked $T_1$ in FIG. 1), and is then raised again quickly to a value which is slightly lower than that which it had at the instant when spinning appeared (stage $T_2$). Thereafter the applied reference is then further increased slowly up to the value it had when spin appeared (stage $T_3$), and finally it is increased very slowly until it catches up with the reference value now being input (stage $T_4$). Naturally this entire procedure is reinitialized each time spinning is detected.

In braking, the reference value is corrected so that the slip of each wheel always limited to a certain value, generally in the range 10% to 20% of the reference speed.

This antispin or antilock technique suffers from the following drawbacks:

It is relatively complex. The processing performed which is described above merely in simplified form, is complicated which means that if performed by analog electronics it requires a large number of circuits thus giving rise to equipment which is voluminous and expensive, and if performed by software integrated in electronic microprocessor control means, then the software is long which may require the size of the memory in the electronic card containing it to be increased, and above all which occupies execution time that can constitute a heavy penalty in a "real time" system.

It requires the speeds of all of the wheels and of all of the axles driven by the traction device to be measured accurately.

It gives rise to severe mechanical stresses on the device mechanics, particularly during traction, because of its repeated, rapid, and major actions taken on the generated torque.

It is a function of the response time of the servo control of the traction system which is downstream therefrom and which responds more or less quickly, thereby requiring numerous adjustments and fine tuning of the system on the vehicle itself.

In traction, by virtue of the theory as described above, it does not guarantee maximum utilization of the available adhesion $CI_0$, as can be seen from FIG. 2 which also shows the applied reference value CI and the corrected reference value CI' as a function of time:

because of the "holes" in the reference value (shaded zones in FIG. 2) for enabling the wheels to recover adhesion; and because of the slowness with which the corrected reference value returns to the input reference value after adhesion has become good again (e.g. on entering a tunnel after a zone in the rain).

SUMMARY OF THE INVENTION

An object of the present invention is to provide various antispin and antilock methods enabling these drawbacks to be avoided, these methods all being based on the same idea: making use of the natural drop in the torque characteristic as a function of speed exhibited by electric motors when certain parameters of the source powering them are kept constant.

In a first aspect, the present invention provides a method of preventing wheel spin or wheel locking on an electric traction vehicle whose traction device includes the servo controlling of one or more control parameters of the motor(s) the traction device to an input reference value, the method being characterized in that the control parameter(s) obtained at the output from the servo control are permanently limited by ideal values for the control parameter(s), which ideal values are such as to make it possible to obtain an input reference value for the speed of rotation of the motor(s)

equal to the real travel speed of the vehicle, referred to as the reference speed, in such a manner as to stabilize the torque transmitted by the motor(s) in the event of wheel spin or wheel locking.

In an embodiment of the invention, the control parameter(s) obtained at the output of the servo control are permanently limited to the ideal values so that in the event of wheel spin or wheel locking, the torque transmitted by the motor(s) is stabilized to a value corresponding to that which enables the maximum available adhesion to be transmitted.

In another embodiment of the invention, after a predetermined duration during which the ideal value(s) has/have been selected for application to the motor instead of the output value(s) from the servo control, said the value(s) is/are replaced by value(s) designed to prevent a small amount of wheel spin being maintained due to operation at the available adhesion.

In another aspect, the invention consists in the application of these methods to detecting wheel spin or wheel locking of an electric traction vehicle, the detection being obtained by detecting the instant at which the values permanently limiting the control parameter(s) obtained at the output(s) of the servo control for stabilizing the torque transmitted by the motor(s) in the event of wheel spin or wheel locking, referred to as limiting values, are selected for application to the motor instead of the output(s) from the servo control.

In another aspect, the invention consists in the application of these methods to measuring the adhesion of the wheels of an electric traction vehicle, the measurement being obtained when the limiting values are constituted by the ideal values, by comparing the torque reference value with the torque actually obtained, with the available adhesion being greater than or equal to the adhesion enabling the reference torque to be transmitted in the event of equality, or less than that in the event that the real torque is less than the reference torque, in which case the real torque is representative of the available adhesion.

In another aspect, the invention provides a method of preventing wheel spin and wheel locking for an electric traction vehicle whose traction device includes servo control of one or more control parameters of the motor(s) of said transmission to an input reference value, the method including prior detection of wheel spin or wheel locking, and being essentially characterized in that it includes blocking the output(s) of the servo control in the event of wheel spin or wheel locking being detected.

BRIEF DESCRIPTION OF THE DRAWING

Other objects and characteristics of the invention appear more clearly on reading the following description of embodiments made with reference to the accompanying drawings, in which, in addition to above-described FIGS. 1 and 2 relating to the prior art:

FIG. 9 is a block diagram of a second embodiment of an antispin or antilock method in accordance with the invention applicable to asynchronous motors powered by a voltage inverter.

DETAILED DESCRIPTION OF THE PREFERRED EMBODIMENTS

The various aspects of the invention may be implemented or embodied in several different ways, in particular depending on the type of motor used.

The embodiments described below correspond more particularly to the two types of motor used most frequently at present in new electric traction devices namely separate excitation DC motors and asynchronous motors powered by voltage inverters.

The description begins with the application of an anti-spin or antilock method of the invention to an electric traction device having a separate excitation DC motor, and initially the description relates to countering wheelspin.

Figure 1:
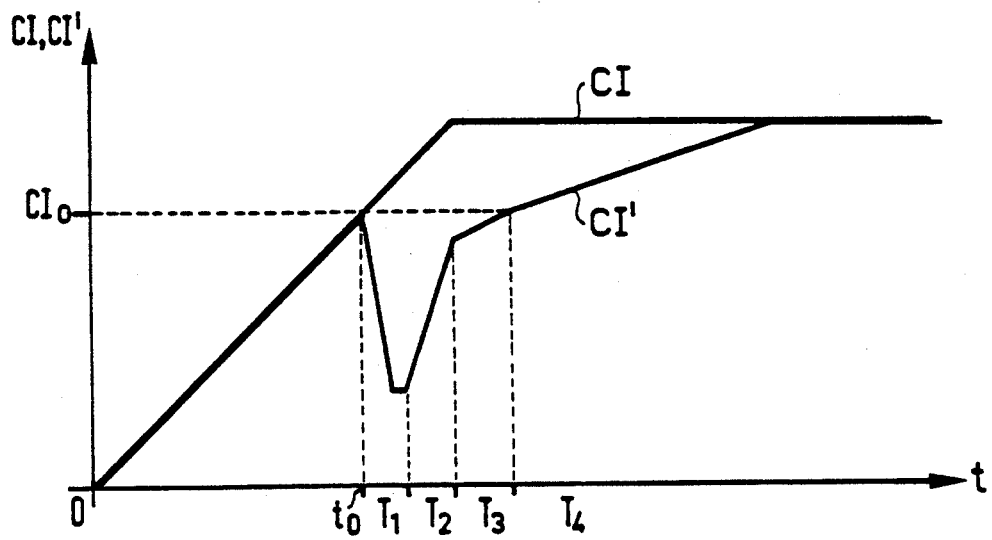
Figure 2:
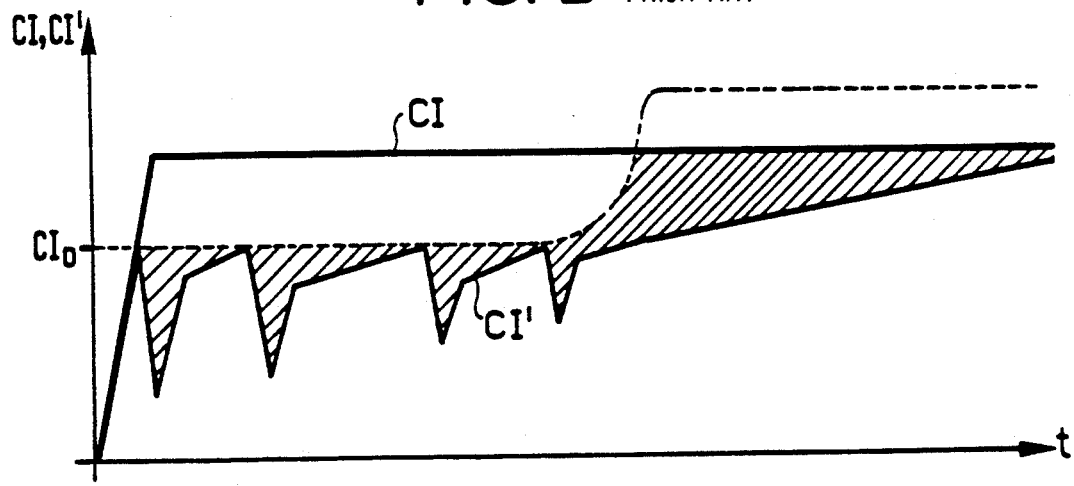
Figure 3:
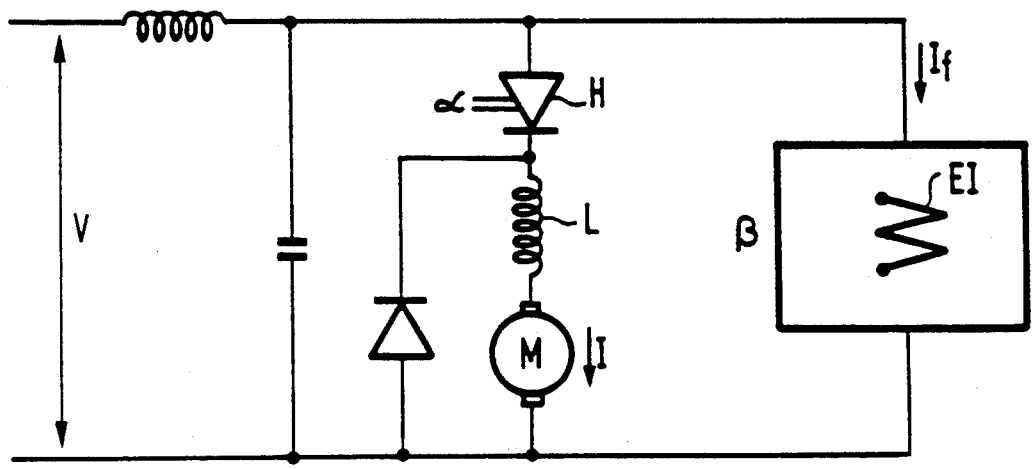
FIG. 3 is a schematic diagram of an electric traction device having a separate excitation DC motor and operating in traction.

FIG. 3 is a simplified block diagram of a traction device having a DC motor M (which may, in fact, be transmission constituted by a plurality of motors connected in series or in parallel) and powered by a chopper H, with the field winding EI of the motor being powered from the same DC voltage source V as the armature winding but via a different chopper or via an excitation bridge.

If E designates the back electromotive force (back-emf) developed by the motor, $\alpha$ the ON time of the armature chopper, and $\underline{r}$ the resistance of the smoothing inductor L and of the armature of the motor M, then the armature current I is given by the equation: $I = (\alpha V - E)/r$. The back emf is proportional to the speed of rotation N of the motor M and to the flux $\phi$ in the machine, and the flux is itself a function of the excitation current $I_f$ given by the angle $\beta$ of the excitation bridge: $E = K.N.\phi(\beta)$ (where K is a constant depending on the motor).

Figure 4:
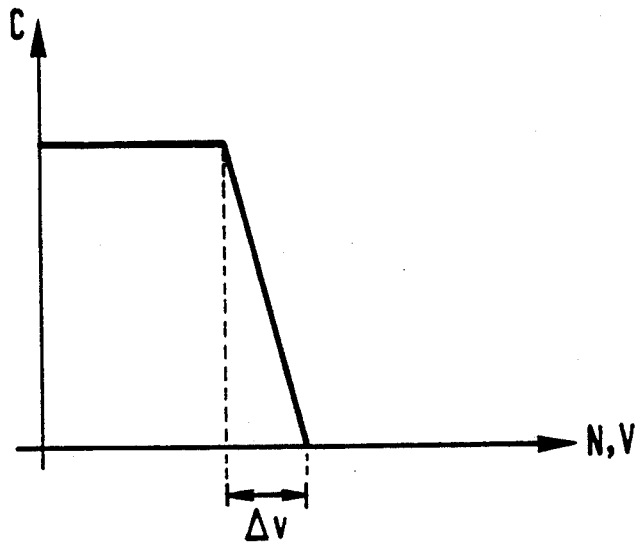
FIG. 4 shows the characteristic of torque as a function of speed of rotation for a separate excitation DC motor.

These two equations show that if $\alpha$ and $\beta$ remain constant, then if the speed of rotation N of the motor increases (because the wheel or the axle driven by the motor is spinning), then the current I and thus the torque developed by the motor decreases. The characteristic of torque C as a function of speed of rotation N has the appearance given in FIG. 4. Since the resistance $\underline{r}$ is generally very low, the slope of this characteristic is steep.

The invention takes advantage of this characteristic. One of the antispin methods of the invention as described below performs conventional servo-control of the torque or of the armature current as a function of the input reference value, thereby determining the ON ratio $\alpha$ of the chopper, but it then limits this ratio to the ideal value of $\alpha$ which would obtain the desired current (i.e. current equal to the reference value) if the motor were turning at a speed corresponding to the reference speed of the vehicle $V_{ref}$ (and thus if the wheel or the axle driven by the motor is not spinning). Thus, the difference between the speed of the wheel driven by the motor and the reference speed of the vehicle can never exceed $\Delta v$ as shown on the characteristic of torque as a function of speed of rotation of the motor and shown in FIG. 4 (and it will only reach this value if the adhesion becomes exactly zero).

This ideal value of $\alpha$, written $\alpha_{th}$, is calculated as follows:

$$\alpha_{th} = (r.C_I + E_{ref})/V$$

where $C_I$ is the input reference for the armature current and $E_{ref} = K.N_{ref}.\phi_c$, where $N_{ref}$ is the speed of rotation of the motor corresponding to the reference speed of the vehicle, and $\phi_c$ is the flux corresponding to the desired torque. $\phi_c$ is given by the characteristic of the motor as a function of the excitation current $I_f$. It is a function of the selected control mode, e.g. maximum flux or series image, giving:

$$I_f = \text{constant} = I_{max} \text{ or } I_f = k.C_I,$$

thereby giving $\phi_c$.

By applying this ideal value $\alpha_{th}$ to the motor, the transmitted torque necessarily stabilizes on the value which the adhesion is capable of transmitting. This can be seen by a demonstration by the absurd: if the transmitted torque were less than the torque allowed by the adhesion then the wheel would slow down (it would stop spinning), and as a result the torque would increase. On the contrary, if the transmitted torque were greater than that allowed by the adhesion, then the wheel would accelerate (it would spin faster) and the torque would decrease. The torque therefore stabilizes continuously to the available adhesion which it follows instantaneously should it vary.

When the definition speed (e.g., rated speed) of the motor is reached, i.e. when $\alpha$ has reached its limiting value $\alpha_{max}$ (it may be observed that it is possible for $\alpha_{max}$ to equal unity if conduction is continuous), then conventionally the armature current is still servo-controlled to the reference as speed increases further by reducing the excitation current $I_f$ and thus the flux $\phi$, in such a manner that the back emf of the motor: $E = K.N.\phi$ remains constant, and thus such that $I = (V.\alpha_{max} - E)/r$ also remains constant.

Here again, in order to avoid sustaining possible wheelspin, an ideal excitation current $I_{fth}$ is determined which is used to reduce $I_f$ in the servo control, with the ideal excitation current being calculated as follows:

the ideal back emf $E_{th}$ is calculated from the input reference value for the armature current, using the equation:

$$E = V.\alpha_{max} - r.C_I,$$

the ideal flux $\phi_{th}$ is calculated from the ideal back-emf using the equation: $\phi_{th} = E_{th}/K.N_{ref}$ which is a function of the reference speed; and the ideal excitation current $I_{fth}$ is deduced from the ideal flux $\phi_{th}$ on the basis of the motor characteristic.

In order to avoid impeding conventional servo control when wheelspin is not occurring, i.e. in order to take account of margins of error in measuring and calculating the various magnitudes concerned, it is preferable to calculate $\alpha_{th}$ and $I_{fth}$ by using a speed which is slightly greater than $N_{ref}$, i.e., $N_{ref}$ is replaced in the above equations by $(a.N_{ref} + b)$, where $a \geq 1$ and $b \geq 0$, with a and b being chosen as a function of the amount of wheel slip that can be tolerated.

It is also possible to apply a value less than $\phi_{th}$ to the motor, in which case the transmitted torque stabilizes to a value which is less than that which the adhesion would allow to be transmitted.

In order to cover the various possible modes of limiting the ON ratio $\alpha$ output by the servo control as described above, we use the term limitation "by" the ideal value $\phi_{th}$, with the term limitation "to" the ideal value being reserved for the special case of equality between the limiting value and the ideal value $\phi_{th}$. Much of the following description is given in terms of the special case.

We now turn to the case of avoiding wheellocking, still for an electric traction transmission using a separate excitation DC motor.

Figure 5:
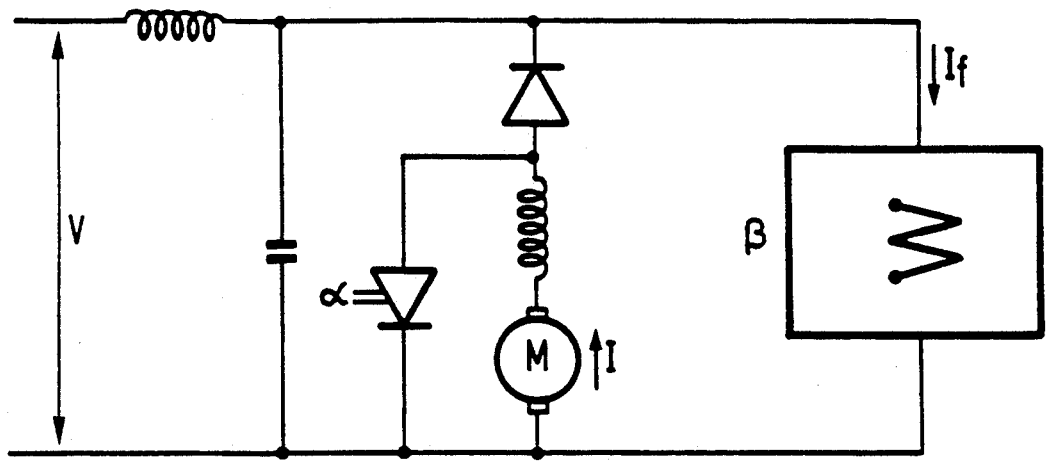
FIG. 5 is a schematic diagram of an electric traction device having a separate excitation DC motor and now operating in braking.

FIG. 5 is a simplified block diagram of the same traction transmission, but configured for electrical braking with energy recovery. The equation which now applies is $I = (E - (1 - \alpha)V)/r$, where E is now the emf of the motor operating as a generator.

Reasoning analogous to that given above shows that in this case the ratio $\alpha$ must be limited to the value: $\alpha_{th} = (rC_I + V - E_{th})/V$ where $E_{th} = K.N_{ref}.\phi_c$, with $\phi_c$ being the desired flux depending on the control mode, which is generally maximum flux mode in this case.

With high speed braking the chopper remains ON for a minimum amount of time ($\alpha = \alpha_{min}$ where $\alpha_{min}$ may be equal to 0 if operating with the chopper OFF), and when the current I is controlled solely by the excitation, the field winding current $I_f$ is limited to the ideal value $I_{fth}$ calculated by:

calculating the ideal emf $E_{th}$ from the reference $C_I$, using the equation $E_{th}:r.C_I + (1 - \alpha_{min})V$;

calculating the ideal flux $\phi_{th}$ from the ideal emf $E_{th}$ using the equation $\phi_{th} = E_{th}/K.N_{ref}$; and deducing the ideal excitation current $I_{fth}$ from the ideal flux $\phi_{th}$ using the motor characteristic.

For the same reasons as in traction, and also to tolerate a certain amount of wheel slip (which may have a cleaning effect on the running surface that is favorable for the following wheels of the vehicle), $N_{ref}$ may be replaced in the preceding equations by $(cN_{ref} + d)$ where $c \leq 1$ and $d \leq 0$.

Naturally the servo control must be protected against saturation when, in traction operation for example, $\phi_{th}$ is strictly less than $\alpha_I$ or $I_{fth}$ is strictly greater than $C_{If}$. In addition, these calculations may be performed by using a filtered measurement of the input voltage for V in order to avoid creating instabilities.

The application of the method described above to an electric traction device having an asynchronous motor powered by a voltage inverter is now described.

In this case, such a traction device is conventionally controlled as follows: torque servo control provides a frequency difference $\Delta f$. The frequency difference $\Delta f$ given by the torque servo control is then added to the measured frequency of rotation $f_r$ of the rotor of the motor, thereby obtaining the frequency $f_s$ at which the stator windings of the motor are powered. The voltage to be applied to the motor is then deduced by simple ratio ($V/f_s = $ constant), limited by the voltage that the source is capable of delivering. The magnitudes V and $f_s$ are then used for generating thyristor switch-on instants for the voltage inverter. The thyristors are typically gate turnoff (GTO) silicon controlled rectifiers.

Figure 6:
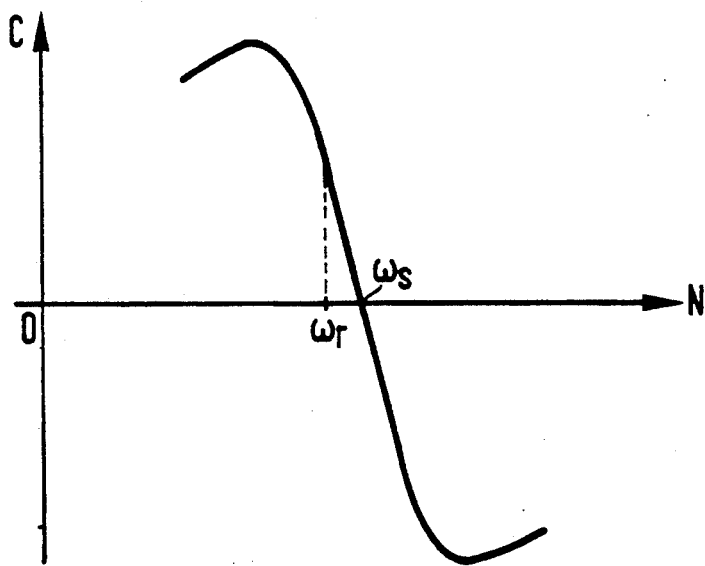
FIG. 6 shows the characteristic of torque as a function of speed of rotation for an asynchronous motor powered by a voltage inverter.

Here again the method relies on the characteristic of the torque of the asynchronous motor as a function of its speed of rotation, or more precisely of its slip: $g=(w_{s-wr}/w_s)$ where $w=2\pi f$:

$$C = 3 \cdot p \cdot V^2 \frac{R_r/(g \cdot w_s)}{(R_s + R_r/g)^2 + (L \cdot w_s)^2}$$

where
 p is the number of pairs of poles in the machine
 V is the voltage between phases
 $R_r$ is the rotor resistance
 $R_s$ is the stator resistance
 L is the leakage self inductance which has the appearance given in FIG. 6.

In traction, the method consists in this case in limiting $f_s$ to $f_{sth}=f_{rth}+\Delta f_{th}$, where $f_{rth}=(a.f_{rref}+b)$, with a and b being selected as a function of acceptable wheel slip ($a\geq 1$, $b\geq 0$) and $f_{rref}$ being the rotor frequency which corresponds to the reference speed of the vehicle, and where $\Delta f_{th}$ is calculated as follows:

For small values of slip, i.e. in the normal operating region of the motor, the expression for torque as a function of slip frequency $f_s-f_r=\Delta f$ has the form $c\approx k.(V/f_s)^2.\Delta f$. Since the motors are controlled with $(V/f_s)$=constant, an ideal slip frequency corresponding to the desired torque C can be deduced:

$$\Delta f_{th}=C/k.(V/f_s)^2$$

In fact, the value of $\Delta f_{th}$ actually used is slightly greater than the result given by the above calculation.

During braking, where it is conventional to calculate $f_s=f_r-\Delta f$, $f_s$ is reduced in this case by $f_{sth}=f_{rth}-\Delta f$, where $f_{rth}=(c.f_{rref}+d)$ (with $c\leq 1$ and $d\leq 0$).

The method described above has the following advantages:

It makes the antispin and/or antilock system currently in use unnecessary. Since it gives rise to calculations which are much simpler, it requires much less electronic circuitry for analog electronic control or much shorter software and thus much faster execution time for microprocessor control. It is therefore more compact and less expensive.

It only requires the reference speed of the vehicle to be known, and it does not require any measurement to be taken of the speed of each of the wheels or of the axles driven by the traction transmission (except, naturally, if the reference speed itself needs to be calculated from the speeds of other wheels).

The response of the system is a function solely of the characteristic of the torque of the controlled traction transmission and of the coefficients a, b, c, and d mentioned above. The choices of these coefficients which determine the slip speed of the wheels are the only choices that may need testing on a vehicle, and even then the amount of testing required will be small.

In theory, the transmitted torque stabilizes continuously to the value which the adhesion is capable of transmitting, and it follows this value instantaneously should it vary, with the method guaranteeing that full use is made of the available adhesion.

By maintaining a certain amount of wheel slip relative to the surface on which the wheels are running, the method causes the leading wheels of the vehicle to clean the running surface to a certain extent, and as a result the following wheels, if they are motorized as well, benefit from improved adhesion and are capable of transmitting greater torque, thereby obtaining better overall acceleration or deceleration for the vehicle.

For vehicles that accelerate over long periods of time (e.g. locomotives), this advantage may become a disadvantage since it keeps the wheels slipping to a small extent for a long time. One way of remedying this is to introduce a time delay at the end of which the adjustment parameter (e.g. $\alpha$) could be reduced voluntarily by calculating it from a torque reference or from a current reference reduced to a value which is slightly less than the torque value or the current value that was obtained during the time delay, and which thus represents the available adhesion. As a result wheel spin is completely eliminated and thereafter this torque or current reference used for calculating the ideal adjustment parameter can be increased again progressively until it returns to the input reference value. The time delay is naturally reinitialized as soon as wheel spin stops.

This antispin or antilock method is described above for a traction device having a separate excitation DC motor and for a device having an asynchronous motor powered by a voltage inverter. It has already been mentioned that the method is applicable to a plurality of DC motors connected in series (in which case the back emf to be taken into consideration is the sum of the individual back emfs) or connected in parallel, and also to a plurality of asynchronous motors connected in parallel. Naturally, the method also applies to a DC motor which is not powered by a chopper from a DC source, but by a rectifier from an AC source. The variable then to be taken into consideration is the angle of the rectifier bridge. When braking with a DC motor, energy may be recovered as shown in FIG. 5, or else rheostatic braking may be used, in which case the voltage U to be taken into consideration is the voltage across the terminals of the braking resistance.

Figure 7:
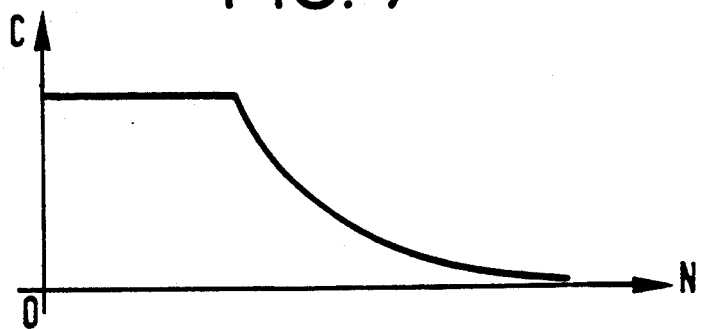
FIG. 7 shows the characteristic of torque as a function of speed of rotation for a series excitation DC motor.

The method is also applicable to traction devices having series excitation DC motors. However, as shown in FIG. 7, the characteristic of torque as a function of speed and at constant feed voltage, has the form: $C=K/\text{speed}^2$, and it therefore does not pass through zero. In the event of very bad adhesion, slip can then become considerable. Finally, and similarly, the method may also be applied to a traction device having self-controlled synchronous motors with the inverter-motor assembly having the characteristic of a DC motor.

An implementation of this method corresponding to an electric traction device having a separate excitation DC motor is now described with reference to FIG. 8.

Figure 8:
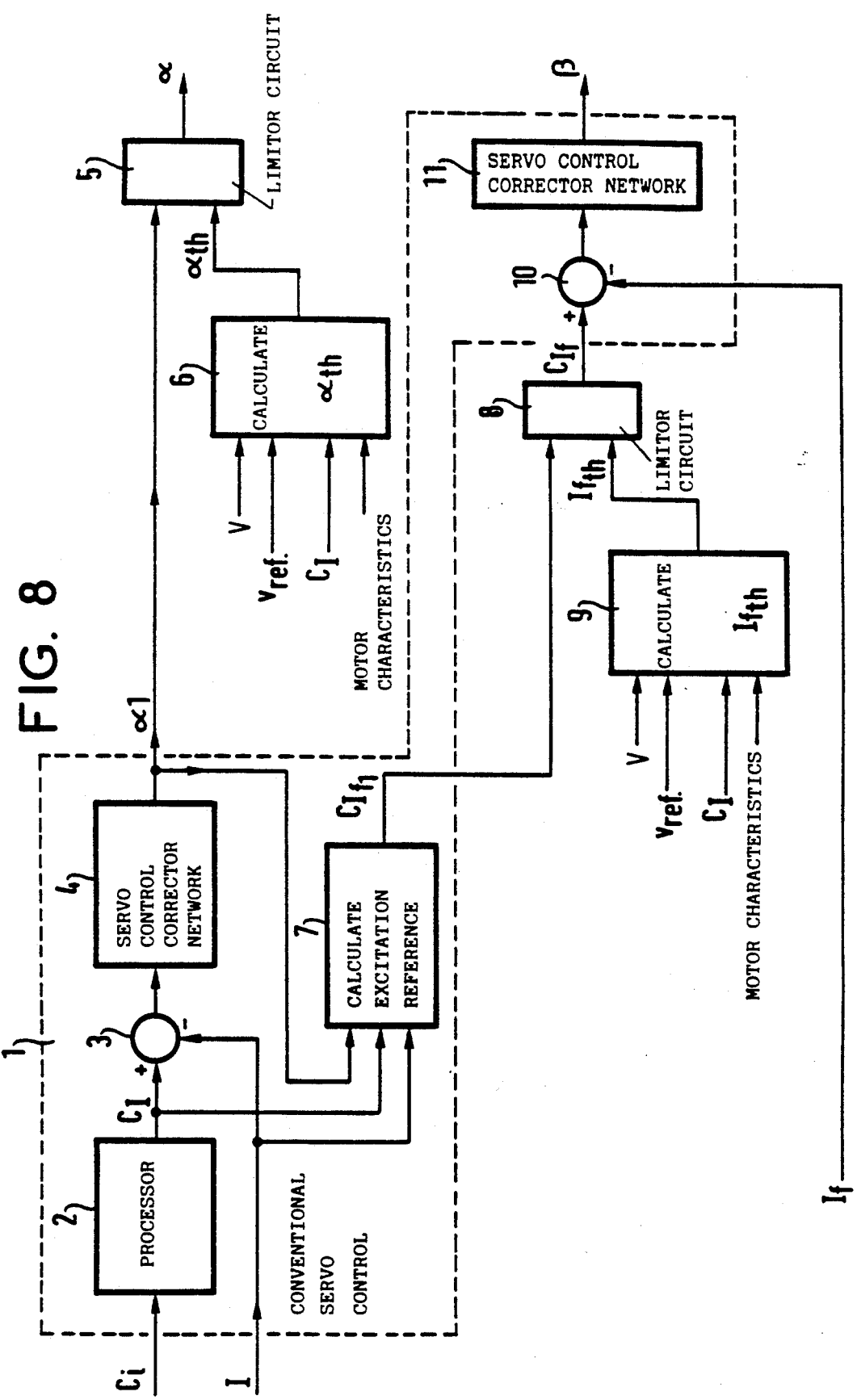
FIG. 8 is a block diagram of a first implementation of an antispin or antilock method in accordance with the invention applicable to separate excitation DC motors.

FIG. 8 shows servo-control means 1 controlling the traction device in conventional manner by determining the adjustment parameters $\alpha$ and $\beta$ for the motor on the basis of an input reference signal. This input reference $C_i$ coming from a driver is applied to a processor circuit 2 which transforms it into a reference value for the armature current $C_I$ which is applied to a subtractor 3 which also receives the measured armature current I. The output from the subtractor is then applied to a servo-control correcting network 4 which delivers a value $\alpha_l$ of the adjustment parameter $\alpha$ on a first output of the servo-control means.

The value $\alpha_l$ is applied to a limiter circuit 5 for limiting it by the ideal value $\alpha_{th}$ provided by a calculator circuit 6, with the output from the limiter circuit 5 then providing the adjustment parameter $\alpha$ which is actually applied to the motor.

The reference value $C_I$ (or the measured armature current I) is also applied to a circuit 7 for calculating the reference excitation current $C_{If}$. This reference excitation current, optionally limited by a limiter circuit 8 to the ideal value $If_{th}$ provided by a calculator circuit 9, is then applied to a subtractor 10 which also receives the measured excitation current $I_f$, with the output from this subtractor then being applied to a servo-control corrector network 11 which delivers the adjustment parameter $\beta$ as applied to the motor.

The components constituting the servo-control means are well known and are therefore not described again here. The calculator circuits 6 and 9 respectively calculate the ideal ON ratio $\phi_{th}$ and the ideal excitation current $I_{fth}$ as described above.

For a device operating in traction, the limiter circuit 5 delivers the smaller of the two values $\alpha_I$ and $\alpha_{th}$ which are applied thereto, whereas the limiter circuit 8 delivers the larger of the two values $C_{Ifl}$ and $If_{th}$ which are applied thereto.

The architecture described above is also suitable for braking, with the processing performed by the servo-control means naturally being different in conventional manner, and with the calculations performed by the calculation circuits 6 and 9 then being modified as described above. The functions of the limiter circuits 5 and 8 are also modified, with the circuit 5 still delivering the smaller of the two values $\alpha_I$ and $\alpha_{th}$ which are applied thereto, while the circuit 8 now delivers the smaller of the two values $C_{IFl}$ and $If_{th}$ which are applied thereto.

In traction, for example, this system operates as follows:

When there is no wheel spin, i.e. when the adhesion is sufficient to transmit the requested torque, then the servo control gives $\alpha_I < \alpha_{th}$. The ON ratio $\alpha$ is then equal to $\alpha_I$. When the adhesion becomes smaller, giving rise to wheel spin, and thus to an increase in the speed of rotation of the motor, the current I tends to diminish and the servo control then increases $\alpha_I$ (or decreases $C_{Ifl}$ if continuous conduction conditions apply) so as to maintain I at the reference value $C_I$. However, when $\alpha_I$ exceeds $\phi_{th}$ (or $C_{Ifl}$ becomes less than $If_{th}$), then it is no longer $\alpha_I$ (or $C_{Ifl}$) which is used to control the power electronics of the motor, but $\alpha_{th}$ (or $If_{th}$). As a result the current I decreases as wheel spin increases, i.e. as the speed of the motor and thus its back emf increases, thus causing the torque to decrease until it reaches a value corresponding to the available adhesion. Slip then remains constant. If adhesion becomes better again, then wheel spin decreases and thus the speed and the back emf of the motors decrease, with the current (and thus the torque) increasing again until it becomes greater than the reference $C_I$. At this point the servo control responds by reducing $\alpha_I$ (or by increasing $C_{Ifl}$) such that I does not exceed $C_I$. $\alpha_{th}$ and $If_{th}$ then become inactive.

An embodiment of apparatus of the invention corresponding to an electric traction device having asynchronous motors powered by a voltage inverter is now described with reference to FIG. 9.

This apparatus comprises servo-control means 20 controlling the traction device in conventional manner by determining an adjustment parameter $\Delta f$ (slip) for the motors on the basis of an input reference. The input reference comes from a driver and is applied to a processor circuit 21 which transforms it into a reference value C for torque or for stator current applied to a subtractor 22 which also receives the measured value of the torque or the stator current. The output from the subtractor is then applied to a servo-control corrector network 22 which delivers a value $\Delta f_l$ for the adjustment parameter $\Delta f$. This value $\Delta f_l$ is applied to a limiter circuit 24 for limiting by the ideal value $\Delta f_{th}$ corresponding to the torque reference and provided by a calculator circuit 25, with the output from the limiter circuit 24 providing the adjustment parameter $\Delta f$ that is applied to the motor after being added to or subtracted from the parameter $f_r$ (motor rotation frequency) in a summing circuit 26 (depending on whether the device is operating in traction or in braking). The parameter $f_r$ is obtained at the output from a limiter circuit 27 which receives firstly the measured frequency $f_{rl}$ of rotation of the motor and secondly the ideal value $f_{rth}$ for said frequency, which ideal value corresponds to the reference speed of the vehicle and is provided by a calculator circuit 28. The adjustment parameter $f_s$ obtained at the output of the summing circuit 26 is the adjustment parameter actually applied to the motor.

The components constituting the servo-control means are well known and are not described again herein. The calculator circuits 25 and 28 respectively calculate the ideal slip $f_{th}$ and the ideal rotation frequency $f_{rth}$ in the manner described above. The limiter circuit 24 delivers the smaller of the two values $\Delta f_l$ and $\Delta f_{th}$ that are applied thereto. The limiter circuit 27 delivers the smaller of the two values $f_{rl}$ and $f_{rth}$ which are applied thereto when the transmission is operating in traction, and the larger of these two values when the transmission is operating in braking.

Naturally, it would be possible to apply the invention to traction device other than those described by way of example. In addition, in the traction devices described above, it would also be possible to use embodiments other than those given by way of example. The values $\alpha_{th}$, $If_{th}$, $f_{rth}$, and $\Delta f_{th}$ could be calculated differently: for example they could be calculated as a function of the reference speed by using a non-affine function.

As already mentioned, it would also be possible to provide a time delay in the method without altering the principle of the invention.

Another way of proceeding consists not in calculating the values $\alpha_{th}$, $If_{th}$, $f_{rth}$, $\Delta f_{th}$, but in blocking the outputs from the servo-control systems when wheel spin or wheel locking is detected (in which case it is necessary to have detectors for the various different speeds), and in releasing these outputs again progressively when the wheel spin or wheel locking disappears (or returns to values that can be tolerated).

The theory of the invention may also be applied to detecting wheel spin or wheel locking in an electric traction vehicle. The instant at which wheel spin or wheel locking appears may be obtained very simply by detecting the instant at which the limiting values of the servo-controlled outputs are selected for application to the motor instead of the servo-control values themselves.

The theory of the invention may also be used for obtaining a measurement of the adhesion of the wheels of an electric traction vehicle very simply. When the limiting values on the servo control are constituted by ideal values, the torque reference (or the current reference) can be compared to the real torque (or real current), thereby indicating whether the available adhesion is greater than or equal to that required for transmitting the requested torque (i.e. when the real torque is equal to the reference) or is less than that (i.e. when the real torque is less than the reference), in which case the real torque constitutes an indicator of the available adhesion.

I claim:

1. A method of preventing wheel spin or wheel locking on an electric traction vehicle whose traction device includes a servo controller for servo controlling at least one control parameter of at least one motor of said traction device to a predetermined value, the method being characterized in that the at least one control parameter output from said servo controller is permanently limited by an ideal value for said at least one control parameter, such that the predetermined value corresponds to a speed of rotation of said at least one motor equal to a real travel speed of the vehicle, in such a manner as to stabilize the torque transmitted by said at least one motor in the event of wheel spin or wheel locking.

2. A method according to claim 1, characterized in that the at least one control parameter output of said servo controller is permanently limited to the ideal value so that in the event of wheel spin or wheel locking, the torque transmitted by said at least one motor is stabilized to a value corresponding to that which enables transmission at the maximum available adhesion.

3. A method according to claim 1, characterized in that said traction device comprises at least one separate excitation DC motor having armature and field windings, and a chopper and an excitation bridge respectively associated with the armature and field windings, the at least one control parameter being an ON ratio of the chopper below a rated speed of said at least one motor and being an ON ratio of the excitation bridge above the rated speed of said motor, and said ideal value permanently limiting the at least one control parameter output from said servo controller so as to stabilize the torque transmitted by said at least one motor in the event of wheel spin or wheel locking being referred to as a limiting value, the control parameter applied to said at least one motor below the rated speed of said at least one motor being the smaller of a first limiting value and a first output from said servo controller; and above the definition speed of said at least one motor being the greater or the smaller of a second limiting value and a second output from said servo controller, depending on whether the traction device is operating in traction or in braking.

4. A method according to claim 1, characterized in that said traction device comprises at least one asynchronous motor powered by a voltage inverter, the at least one control parameter being the frequency of the stator feed to said at least one asynchronous motor, said servo controller servo controls a slip frequency of said at least one asynchronous motor, with a measured value of rotation of said at least one asynchronous motor subsequently being added thereto to obtain the frequency of the stator feed, and said ideal value permanently limiting the at least one control parameter output from said servo controller so as to stabilize the torque transmitted by said at least one asynchronous motor in the event of wheel spin or wheel locking being referred to as a limiting value, the control parameter applied to said asynchronous motor is obtained by selecting the smaller of the following two values for a slip value: a first limiting value and a first value delivered by the servo controller, and in selecting, as the frequency of rotation, the smaller or the greater of a second limiting value and the measured value, depending on whether said traction device is operating in traction or in braking.

5. A method according to claim 1, characterized in that the control parameter output by said servo controller is limited to the ideal value so that in the event of wheel spin or wheel locking, and after a predetermined duration during which the ideal value has been selected for application to said at least one motor instead of the output value form said servo controller, said ideal value is replaced by a value designed to prevent a small amount of wheel spin being maintained due to operation at the available adhesion.

6. A method according to claim 5, characterized in that said value for avoiding a small amount of wheel spin being maintained is constituted by values that permanently limit the at least one control parameter output from said servo controller in such a manner as to stabilize the transmitted torque, in the event of wheel spin or wheel locking, to a value which is lower than the value which the available adhesion is capable of transmitting.

7. A method according to claim 5, characterized in that said value for preventing a small amount of wheel spin being maintained is constituted by outputs of said servo controller to which a reference value is applied that has been reduced to a value corresponding to the value of the torque obtained during said predetermined duration.

8. A method according to claim 1, wherein said method is applied to detect wheel spin or wheel locking in an electric traction vehicle, the method being further characterized in that said detection of wheel spin or wheel locking is obtained by detecting the instant at which said ideal value permanently limiting the control parameter obtained at the output of said servo controller for stabilizing the torque transmitted by said motor in the event of wheel spin or wheel locking, referred to as a limiting value, is selected for application to said at least one motor instead of the output from said servo controller.

9. A method according to claim 2, wherein said method is applied to measure adhesion of an electric traction vehicle, the method being further characterized in that the measurement of adhesion is obtained by comparing a torque reference value with the torque actually obtained, with the available adhesion being greater than or equal to the adhesion enabling the reference torque to be transmitted in the event of equality, or less than that in the vent that the real torque is less than the reference torque, in which case the real torque is representative of the available adhesion.

* * * * *